United States Patent
Chen

(10) Patent No.: US 11,231,746 B2
(45) Date of Patent: Jan. 25, 2022

(54) FOLDING SCREEN DEVICE AND MAGNETIC-FIELD DETECTION METHOD

(71) Applicant: BEIJING XIAOMI MOBILE SOFTWARE CO., LTD., Beijing (CN)

(72) Inventor: Chaoxi Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 41 days.

(21) Appl. No.: 16/805,748

(22) Filed: Feb. 29, 2020

(65) Prior Publication Data

US 2021/0124396 A1 Apr. 29, 2021

(30) Foreign Application Priority Data

Oct. 29, 2019 (CN) .......................... 201911039237.X

(51) Int. Cl.
*G06F 1/26* (2006.01)
*G06F 1/16* (2006.01)
*G01B 5/24* (2006.01)
*G06F 1/28* (2006.01)

(52) U.S. Cl.
CPC ............. *G06F 1/1641* (2013.01); *G01B 5/24* (2013.01); *G06F 1/263* (2013.01); *G06F 1/28* (2013.01)

(58) Field of Classification Search
CPC .......... G06F 1/1641; G06F 1/263; G06F 1/28; G01B 5/24
See application file for complete search history.

(56) References Cited

U.S. PATENT DOCUMENTS

| | | | |
|---|---|---|---|
| 2011/0241998 A1* | 10/2011 | McKinney | G06F 1/169 345/168 |
| 2013/0342090 A1* | 12/2013 | Ahn | G06F 1/1616 312/258 |
| 2014/0118317 A1* | 5/2014 | Song | G09G 5/14 345/204 |
| 2016/0180757 A1* | 6/2016 | Um | G09G 3/20 345/204 |
| 2017/0206049 A1* | 7/2017 | Choi | G06F 1/1652 |
| 2018/0129262 A1* | 5/2018 | Veiga | G06F 1/1681 |
| 2020/0379516 A1* | 12/2020 | Park | G06F 1/1641 |

* cited by examiner

*Primary Examiner* — Zahid Choudhury
(74) *Attorney, Agent, or Firm* — Syncoda LLC; Feng Ma

(57) ABSTRACT

A folding screen device includes a first body, a second body, a central processing unit (CPU), a first acceleration gyro sensor, a second acceleration gyro sensor, a first geomagnetic module and a second geomagnetic module. The first acceleration gyro sensor and the second acceleration gyro sensor are configured to obtain a body status of the folding screen device. The CPU is configured to control working statuses of the first geomagnetic module and the second geomagnetic module according to the body status.

20 Claims, 9 Drawing Sheets

FOLDING SCREEN DEVICE AND MAGNETIC-FIELD DETECTION METHOD

CROSS-REFERENCE TO RELATED APPLICATION

This application claims priority to Chinese Patent Application 201911039237.X, filed on Oct. 29, 2019, the disclosure of which is hereby incorporated by reference in its entirety.

BACKGROUND

With the development of technologies, mobile terminals are seeing a more diversified development. A folding screen has become trendy for mobile terminals.

SUMMARY

The present disclosure relates generally to the field of display screen technologies, and more specifically to a folding screen device, a magnetic-field detecting method implemented thereby, a terminal, and a storage medium.

Embodiments of the present disclosure provide a folding screen device and a magnetic-field detecting method implemented thereby, and therefore can facilitate compass and GPS navigation functioning by determining magnetic fields around the terminals.

In one aspect, a folding screen device is provided, including a first body, a second body, a central processing unit (CPU), a first acceleration gyro sensor, a second acceleration gyro sensor, a first geomagnetic module and a second geomagnetic module, wherein the first geomagnetic module, the second geomagnetic module, the first acceleration gyro sensor and the second acceleration gyro sensor are connected to the CPU respectively;

the first geomagnetic module and the first acceleration gyro sensor are inside the first body, and the second geomagnetic module and the second acceleration gyro sensor are inside the second body;

the first acceleration gyro sensor and the second acceleration gyro sensor are configured to obtain a body status of the folding screen device; and the CPU is configured to control working statuses of the first geomagnetic module and the second geomagnetic module according to the body status.

In another aspect, a magnetic-field detecting method implemented by a folding screen device is provided, the folding screen device includes a first body, a second body, a first acceleration gyro sensor, a second acceleration gyro sensor, a first geomagnetic module and a second geomagnetic module, and the method includes:

acquiring first acceleration data collected by the first acceleration gyro sensor and second acceleration data collected by the second acceleration gyro sensor;

determining power supply modes for the first geomagnetic module and the second geomagnetic module according to the first acceleration data and the second acceleration data;

determining, from the first geomagnetic module and the second geomagnetic module, a target geomagnetic module for receiving power according to the power supply mode;

controlling the target geomagnetic module to detect a magnetic field environment.

In yet another aspect, there is provided a folding screen device, including:

a processor and a memory, wherein the memory stores at least one instruction, at least one program and a code set or an instruction set, the at least one instruction, the at least one program and the code set or the instruction set is loaded and executed by the processor, the processor is configured to:

acquire first acceleration data collected by the first acceleration gyro sensor and second acceleration data collected by the second acceleration gyro sensor;

determine power supply modes for the first geomagnetic module and the second geomagnetic module according to the first acceleration data and the second acceleration data;

determine, from the first geomagnetic module and the second geomagnetic module, a target geomagnetic module for receiving power according to the power supply mode;

control the target geomagnetic module to detect a magnetic field environment.

In yet another aspect, there is provided a computer-readable storage medium. At least one instruction, at least one program and a code set or an instruction set are stored in the computer-readable storage medium and loaded and executed by a processor to implement the magnetic-field detecting methods for the folding screen devices described above.

It should be understood that the above general description and the detailed description below are merely used to explain the present disclosure, and cannot be construed as a limitation to the present disclosure.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

The present disclosure will be described in further detail with reference to the accompanying drawings, to present the objects, technical solutions, and advantages of the present disclosure more clearly.

At present, the way for a mobile terminal to detect a surrounding magnetic field is mainly to place a geomagnetic sensor in a mobile phone and to preset the direction of the geomagnetic sensor, such that a user who holds the mobile phone in the forward direction can accurately obtain a magnetic-field environment around the mobile phone and acquire further orientation indications.

However, as a folding screen has a different working status from a traditional mobile phone, the orientation of the screen or electrification of the geomagnetic sensor inside is not the same under different working conditions. The mobile phone detects the surrounding magnetic field in different ways when the folding screen is folded and unfolded.

First of all, a folding screen device involved in the embodiments of the present disclosure is described in detail.

Figure 1:
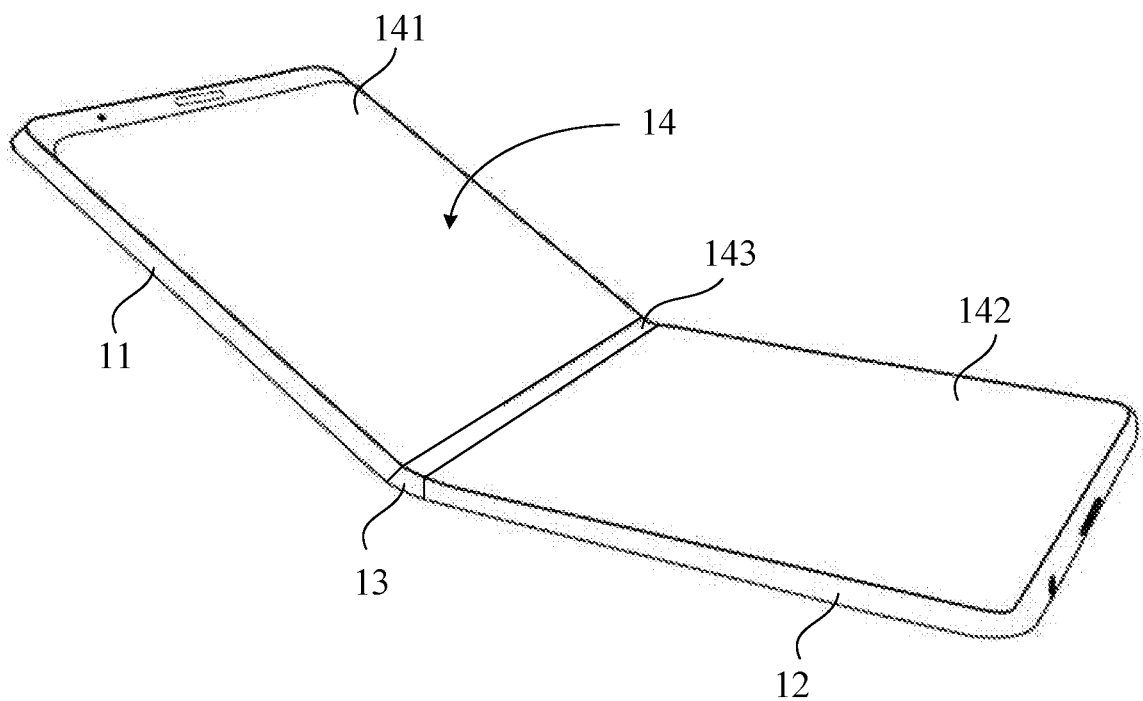
FIG. 1 is a schematic structural diagram of a folding screen device provided by some embodiments of the present disclosure.

FIG. 1 is a schematic structural diagram of a folding screen device provided by some embodiments of the present disclosure. Referring to FIG. 1, the folding screen device 10 includes a first body 11, a second body 12, a connecting component 13 connected between the first body 11 and the second body 12, and a folding display screen 14. The first body 11 and the second body 12 are turned over and folded by the connecting component 13. In some embodiments, the first body 11, the second body 12 and the connecting component 13 may be integrated during manufacture, and may also be spliced after being manufactured separately. The folding display screen 14 is a touch panel display screen.

The folding display screen 14 includes a first screen area 141, a second screen area 142 and a third screen area 143. The first screen area 141 is fixedly connected to the first body 11. The second screen area 142 is fixedly connected to the second body 12. The third screen area 143 corresponds to the connecting component 13.

The folding display screen 14 may be folded and turned over in the following ways: (1) the first body 11 and the fixedly connected first screen area 141, as well as the second body 12 and the fixedly connected second screen area 142, and the connecting component 13 and the third screen area 143, are made of flexible materials, and thus have certain flexibility and ductility; and (2) the connecting component 13 and the third screen area 143 are made of flexible materials, and the first body 11 and the fixedly connected first screen area 141, as well as the second body 12 and the fixedly connected second screen area 142, are made of non-flexible materials.

Figure 2:
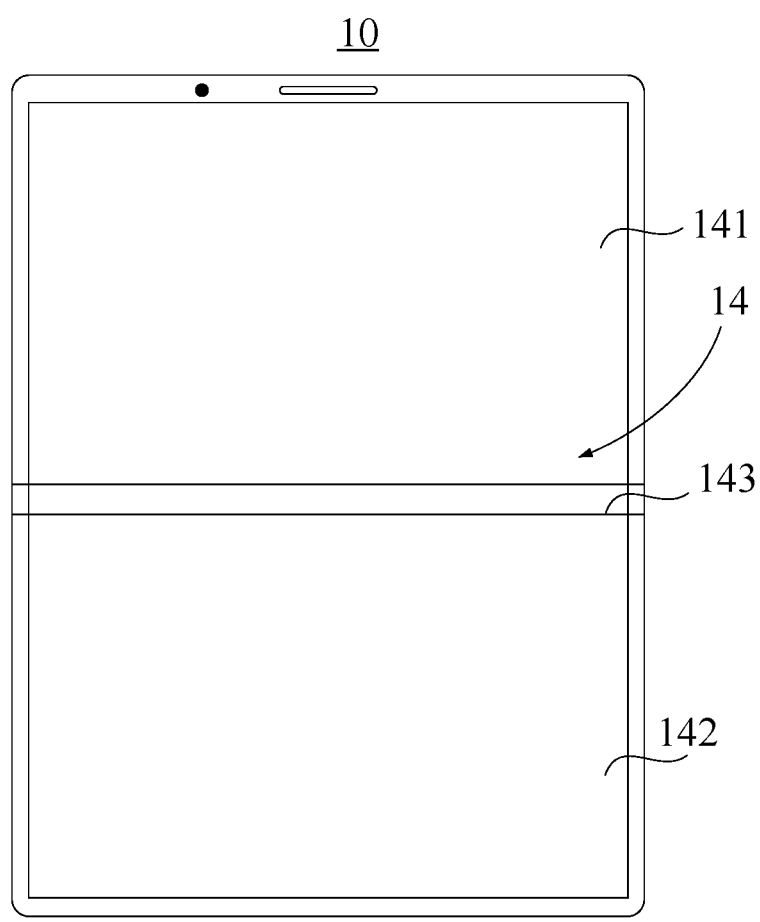
FIG. 2 is a schematic diagram showing an unfolded status of the folding display screen provided by the embodiment of the present disclosure.

The folding display screen 14 may be in an unfolded status or folded status. FIG. 2 is a schematic diagram showing an unfolded status of a folding display screen provided by some embodiments of the present disclosure. Referring to FIG. 2, a user can hold and unfold the first body 11 and the second body 12 to make the folding display screen 14 be in the unfolded status (it should be noted that in the unfolded status, the two screen areas on the folding display screen may be unfolded to form the same plane or a V shape at a certain angle).

Figure 3:
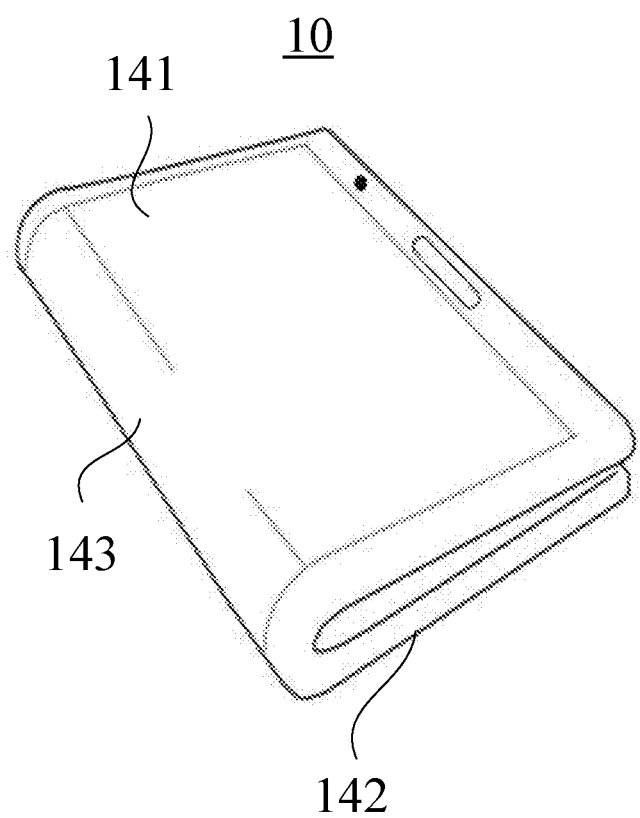
FIG. 3 is a schematic diagram showing a folded status of the folding display screen provided by the embodiment of the present disclosure.

FIG. 3 is a schematic diagram showing a folded status of the folding display screen provided by some embodiments of the present disclosure. As shown in FIG. 3, the user can hold and fold the first body 11 and the second body 12 to make the folding display screen 14 be in the folded status (it should be noted that in the folded status, the two screen areas on the folding display screen may be folded to be in contact or parallel with and close to each other, and may also be folded to form a V shape at a certain angle).

Figure 4:
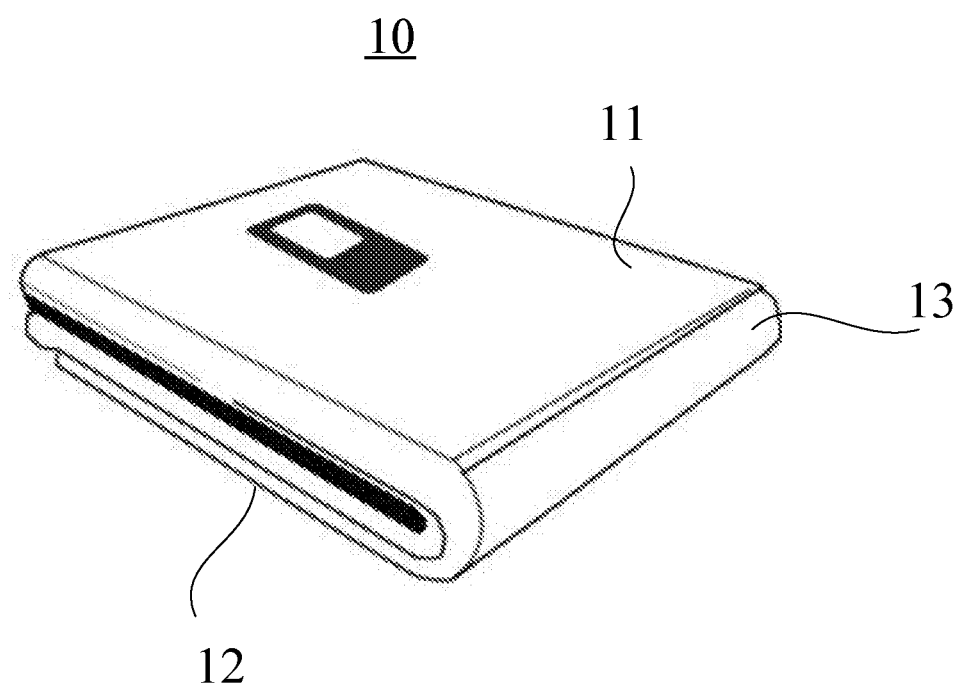
FIG. 4 shows a folded status where a folding display screen is located inside provided by some embodiments of the present disclosure.

The folded status includes an inwardly folded status and an outwardly folded status. As shown in FIG. 3, the outwardly folded status is a folded status where the folding display screen 14 is located outside. FIG. 4 shows a folded status where a folding display screen is located inside provided by some embodiments of the present disclosure.

Referring to FIG. 4, all or part of the folding display screen 14 is received inside in the inwardly folded status. In these embodiments, the folded status of the folding display screen 14 may include the inwardly folded status and outwardly folded status; or, the folded status of the folding display screen 14 includes only the inwardly folded status; or, the folded status of the folding display screen 14 includes only the outwardly folded status.

Figure 5:
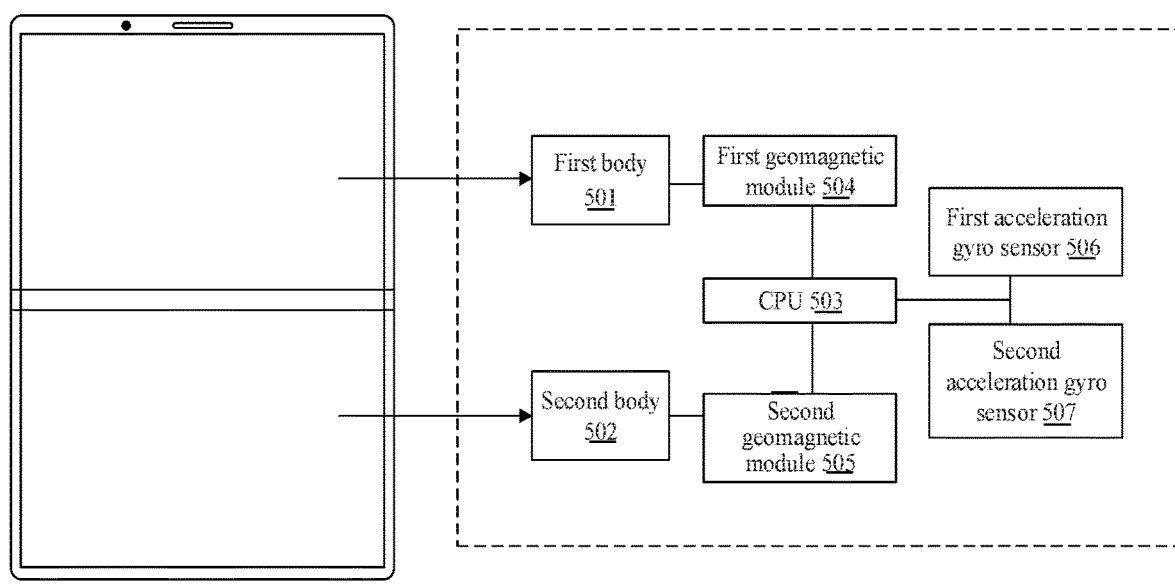
FIG. 5 is a schematic structural diagram of a folding screen device provided by some embodiments of the present disclosure.

FIG. 5 is a schematic structural diagram of a folding screen device provided by some embodiments of the present disclosure. The folding screen device includes:

a first body 501, a second body 502, a CPU 503, a first acceleration gyro sensor 506, a second acceleration gyro sensor 507, a first geomagnetic module 504 and a second geomagnetic module 505.

The working principle of the folding screen device provided by these embodiments will be explained below.

The first geomagnetic module 504, the second geomagnetic module 505, the first acceleration gyro sensor 506 and the second acceleration gyro sensor 507 are connected to the CPU 503 respectively. The first geomagnetic module 504 and the first acceleration gyro sensor 506 are located inside the first body 501. The second geomagnetic module 505 and the second acceleration gyro sensor 507 are located inside the second body 502.

The first acceleration gyro sensor 506 is configured to acquire first acceleration data. The second acceleration gyro sensor 507 is configured to acquire second acceleration data. The first acceleration data and the second acceleration data are configured to indicate a body status of the folding screen device. The CPU is configured to control working statuses of the first geomagnetic module 504 and the second geomagnetic module 505 according to the body status. After determination of the working statuses, the first geomagnetic module 504 and the second geomagnetic module 505 detect a magnetic field environment of the folding screen device according to the determined working statuses.

As such, according to the folding screen device provided by these embodiments, since the first acceleration gyro sensor and the second acceleration gyro sensor are disposed to detect the body status of the folding screen device to further determine the working statuses of the first geomagnetic module and the second geomagnetic module, the magnetic field environment of the folding screen device is detected by the first geomagnetic module and/or the second geomagnetic module, which makes the folding screen device in different working statuses accurately detect the magnetic field environment by the corresponding geomagnetic module.

In some embodiments, the folding screen device further includes a first power source and a second power source. The first power source is connected to the first geomagnetic module and configured to supply power for the first geomagnetic module with control of the CPU. The second power source is connected to the second geomagnetic module and configured to supply power for the second geomagnetic module with control of the CPU.

In some embodiments, the way in which the CPU controls the working statuses of the first geomagnetic module and the second geomagnetic module according to the body status includes controlling power supply for the first geomagnetic module and the second geomagnetic module according to the body status. In some embodiments, the first geomagnetic module and the second geomagnetic module are respectively provided with the first power source and the second power source.

The first power source is configured to supply power for the first geomagnetic module, and the second power source is configured to supply power for the second geomagnetic module. In some embodiments, the first power source is disposed inside the first body, and the second power source is disposed inside the second body, which facilitates wiring inside the folding screen device. In some embodiments, both the first power source and the second power source are provided with a switch. The CPU controls power supply for the first geomagnetic module by turning on and off the switch of the first power source, and controls power supply for the second geomagnetic module by turning on and off the switch of the second power source.

In some embodiments, the folding screen device further includes a first resistor, a second resistor, a third resistor and a fourth resistor.

A first end of the first power source is connected to a first port of the first geomagnetic module by the first resistor. A second end of the first power source is connected to a second port of the first geomagnetic module by the second resistor. The first resistor and the second resistor are configured to control the output voltage of the first power source.

A first end of the second power source is connected to a third port of the second geomagnetic module by the third resistor. A second end of the second power source is connected to a fourth port of the second geomagnetic module by the fourth resistor. The third resistor and the fourth resistor are configured to control the output voltage of the second power source.

In some embodiments, the CPU includes a first control interface and a first data interface. The first geomagnetic module includes a first port connected to the first control interface and a second port connected to the first data interface.

In some embodiments, the CPU includes a second control interface and a second data interface. The second geomagnetic module includes a third port connected to the second control interface and a fourth port connected to the second data interface.

Figure 6:
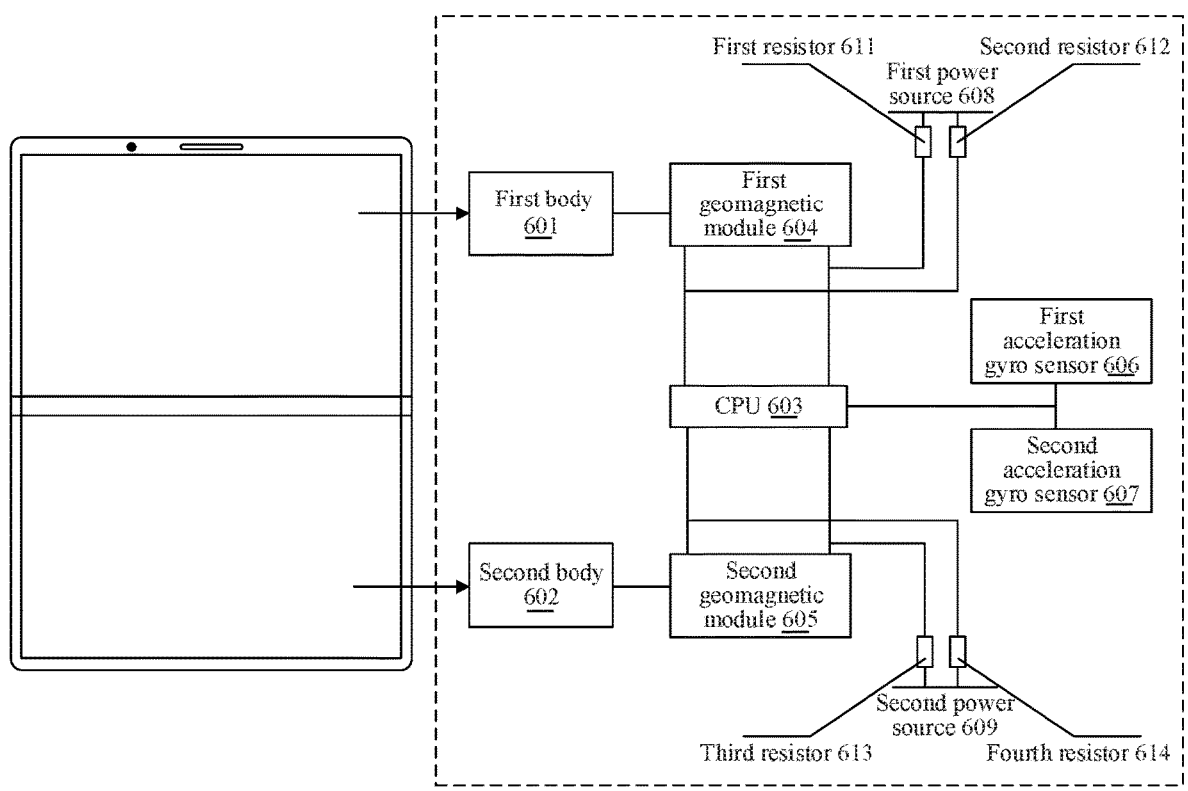
FIG. 6 is a schematic structural diagram of a folding screen device provided by another embodiment of the present disclosure.

FIG. 6 is a schematic structural diagram of a folding display screen provided by another embodiment of the present disclosure. Referring to FIG. 6, optionally, the CPU 603 controls the first geomagnetic module 604 and the second geomagnetic module 605 by a communication interface circuit.

In some embodiments, the CPU 603 controls the working statuses of the first geomagnetic module 604 and the second geomagnetic module 605 by the communication interface circuit, which includes controlling start and stop of the first geomagnetic module 604 and the second geomagnetic module 605 by controlling the first power source 608 and the second power source 609. At the same time, the CPU 603 configures initial data of the first geomagnetic module 604 and the second geomagnetic module 605 by the communication interface circuit.

Therefore, the CPU 603 is provided with a first data interface, which is connected to the first port of the first geomagnetic module 604 and configured to send and receive data with the first geomagnetic module 604. The CPU 603 is provided with a first control interface, which is connected to the second port of the first geomagnetic module 604 and configured to control the working status and the working content of the first geomagnetic module 604.

The CPU 603 is provided with a second data interface, which is connected to the third port of the second geomagnetic module 605 and configured to send and receive data with the second geomagnetic module 605. The CPU 603 is provided with a second control interface, which is connected to the fourth port of the second geomagnetic module 605 and configured to control the working status and the working content of the second geomagnetic module 605.

In some embodiments, the folding screen device further includes a first resistor 611, a second resistor 612, a third resistor 613 and a fourth resistor 614 which mainly play a role of pulling up or down a voltage drop. In one example, a first port of the first power source 608 is connected to the first port of the first geomagnetic module 604 by the first resistor 611. The first port of the first geomagnetic module 604 is also connected to the first control interface of the CPU 603. When the first geomagnetic module 604 works, the first geomagnetic module 604, the first power source 608 and CPU 603 will produce a current and an unstable voltage drop in their connecting circuits. That is, the first geomagnetic module 604 will receive an unstable signal by the first port.

At this time, the first resistor 611 is added to pull up or down the voltage drop, such that the voltage drop is controlled to be within a voltage range in which the voltage drop may be converted into a signal considered valid by the first geomagnetic module. That is, in the working status, no matter how the current in the loop changes, the first geomagnetic module will always receive a high-level or low-level signal.

Similarly, the second resistor 612 is disposed between a second port of the first power source 608 and the first geomagnetic module 604. The third resistor 613 is disposed between a first port of the second power source 609 and the second geomagnetic module 605. The fourth resistor 614 is disposed between a second port of the second power source 609 and the second geomagnetic module 605. Thus, all of these play a role of pulling up or down the voltage drop.

As such, according to the folding screen device provided by these embodiments, since the first acceleration gyro sensor and the second acceleration gyro sensor are disposed to detect the body status of the folding screen device to further determine the working statuses of the first geomagnetic module and the second geomagnetic module, the magnetic field environment of the folding screen device is detected by the first geomagnetic module and/or the second geomagnetic module, which makes the folding screen device in different working statuses accurately detect the magnetic field environment by the corresponding geomagnetic module.

As the first power source and the second power source are independently disposed and independently supplied power for the first geomagnetic module and the second geomagnetic module, start and stop of the geomagnetic modules are independently controlled. Owing to the different function ports of the CPU and the corresponding interfaces of the geomagnetic modules, as well as the pull-up resistors on each line, electrical signals received by the geomagnetic modules are always valid signals.

Figure 7:
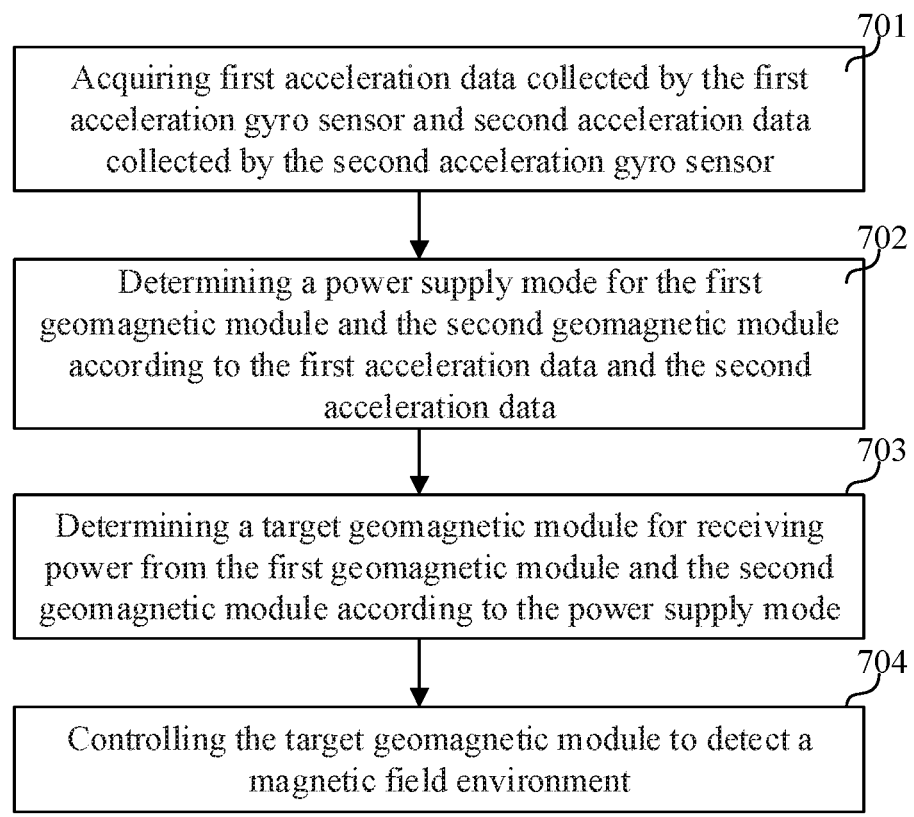
FIG. 7 is a flowchart of a magnetic-field detecting method implemented by a folding screen device provided by some embodiments of the present disclosure.

FIG. 7 is a flowchart of a magnetic-field detecting method for a folding screen device provided by some embodiments of the present disclosure. The method is applied to the folding screen device illustrated in FIG. 5. That is, the folding screen device includes a first body, a second body, a CPU, a first acceleration gyro sensor, a second acceleration gyro sensor, a first geomagnetic module and a second geomagnetic module. The method includes the following steps.

In step 701, first acceleration data collected by the first acceleration gyro sensor and second acceleration data collected by the second acceleration gyro sensor are acquired.

In some embodiments, the first acceleration gyro sensor is disposed inside the first body, and the second acceleration gyro sensor is disposed inside the second body. In some embodiments, when the screen area is in an outwardly folded status, that a first screen area faces vertically upward is taken as an initial working status of the first acceleration gyro sensor, and that a second screen area faces vertically upward is taken as an initial working status of the second acceleration gyro sensor.

Both of the first acceleration gyro sensor and the second acceleration gyro sensor are acceleration gyro sensors. The acceleration gyro sensor is an integration of an acceleration sensor and a gyro sensor and has the main functions of measuring the body status of the folding screen device using the gyro sensor and measuring the acceleration of the folding screen device using the acceleration sensor.

The acceleration sensor is a sensor that can measure the acceleration, and the sensor uses the Newton's second law of motion to obtain the acceleration value by measuring an inertial force on a mass block. In some embodiments, the acceleration sensors are classified into a plurality of types based on their different sensitive elements. In addition, the gyro sensor is based on the principle that when an object is rotating, a direction pointed by its rotation axis will not change when the object is insusceptible to an external force. Based on this principle, while maintaining the rotation of the axis, the direction indicated by the axis is read in various ways, and a data signal is transmitted to a terminal.

In some embodiments, acceleration data includes acceleration direction data and acceleration value data. In some embodiments, the acceleration value data is acquired by the acceleration sensor function of the acceleration gyro sensor, and the acceleration direction data is acquired by the gyro sensor function of the acceleration gyro sensor. In some embodiments, the acceleration data includes first acceleration data and second acceleration data.

The first acceleration data is acquired by the first acceleration gyro sensor, and the second acceleration data is acquired by the second acceleration gyro sensor. In some embodiments, the first acceleration gyro sensor indicates the body status of the first body by the first acceleration direction data and the first acceleration value data, and the second acceleration gyro sensor indicates the body status of the second body by the second acceleration direction data and the second acceleration value data.

In some embodiments, the first body includes a first display screen, and the second body includes a second display screen. When both of the first display screen and the second display screen face vertically upward, power is supplied for the first geomagnetic module and the second geomagnetic module; when the first display screen faces vertically upward, and the second display screen faces vertically downward, power is supplied for the first geomagnetic module; and when the second display screen faces vertically upward and the first display screen faces vertically downward, power is supplied for the second geomagnetic module.

In some embodiments, each of the first body and the second body is equipped with a display screen capable of functionally interacting with the user. In some embodiments, when the display screen faces vertically upward, it can be determined that the body corresponding to the display screen is in the working status; when the display screen faces vertically downward, it can be determined that the body corresponding to the display screen is not in the working status. In some embodiments, the vertical upward direction is not upwardly perpendicular to the horizon. In one example, when the first display screen faces upward and an angle between the first display screen and the ground is smaller than or equal to 20 degrees, it can be determined that the first display screen faces vertically upward. In some embodiments, the orientation of the display screen represents different orientations of the body, that is, it corresponds to different acceleration value data and acceleration direction data.

In one example, the first acceleration value data is the same as the second acceleration value data, and acceleration directions indicated by the first acceleration direction data and the second acceleration direction data are the same and are both negative signs. At this time, the acceleration value data and the acceleration direction data together indicate that the orientations of the first body and the second body are the same, and both of the first screen area and the second screen area face upward. In some embodiments, the acceleration direction can be determined by the sign of the acceleration value data.

In some embodiments, the acceleration direction can be determined by the direction indicated by the gyro sensor. In one example, the first acceleration value data and the second acceleration value data are unequal. At this time, the body statuses of the first body and the second body need to be judged by virtue of the first acceleration direction data and the second acceleration direction data. Further, the orientations of the first screen area and the second screen area are judged.

In step 702, a power supply mode for the first geomagnetic module and the second geomagnetic module is determined according to the first acceleration data and the second acceleration data.

In some embodiments, the body statuses of the first body and the second body can be determined after the first acceleration data and the second acceleration data are acquired, and further, working statuses of the first screen area and the second screen area are determined.

In some embodiments, the working statuses of the first screen area and the second screen area instruct the user to work by the corresponding screen areas. In some embodiments, the first screen area works when the folding screen device is in the outwardly folded status and the user uses the folding screen device via the first screen area, the second screen area works when the folding screen device is in the outwardly folded status and the user uses the folding screen device via the second screen area, and both of the first screen area and the second screen area work when the folding screen device is in an unfolded status and the user uses the folding screen device.

In some embodiments, after determination of the screen area that works, the power supply mode for the first geomagnetic module and the second geomagnetic module is determined. In one example, the power supply mode is to supply power for only the first geomagnetic module when the folding screen device is in the outwardly folded status and the user uses the folding screen device via the first screen area. In one example, the power supply mode is to supply power for only the second geomagnetic module when the folding screen device is in the outwardly folded status and the user uses the folding screen device via the second screen area.

In step 703, a target geomagnetic module for receiving power is determined from the first geomagnetic module and the second geomagnetic module according to the power supply mode.

Each of the first geomagnetic module and the second geomagnetic module includes a measuring module with a magnetic-field measuring component. In some embodiments, the power supply mode is determined according to a service status of the folding screen device. In some embodiments, when the folding screen device is in the unfolded status, the power supply mode is to supply power for only the first geomagnetic module or the second geomagnetic module to maintain the consistency of final measurement results.

In some embodiments, when the folding screen device is in the unfolded status, the power supply mode is to simultaneously supply power for the first geomagnetic module and the second geomagnetic module, and the two geomagnetic modules start their detection at the same time to reduce errors caused when the single geomagnetic modules perform detection.

In step 704, the target geomagnetic module is controlled to detect a magnetic field environment.

In the related art, a user terminal generally measures a magnetic field by a magnetic-field measuring component built in the user terminal. The principle for the magnetic-field measuring component to measure a magnetic field includes at least one of a Hall effect principle, a magnetic saturation principle and a magnetoresistance effect principle.

Figure 8:
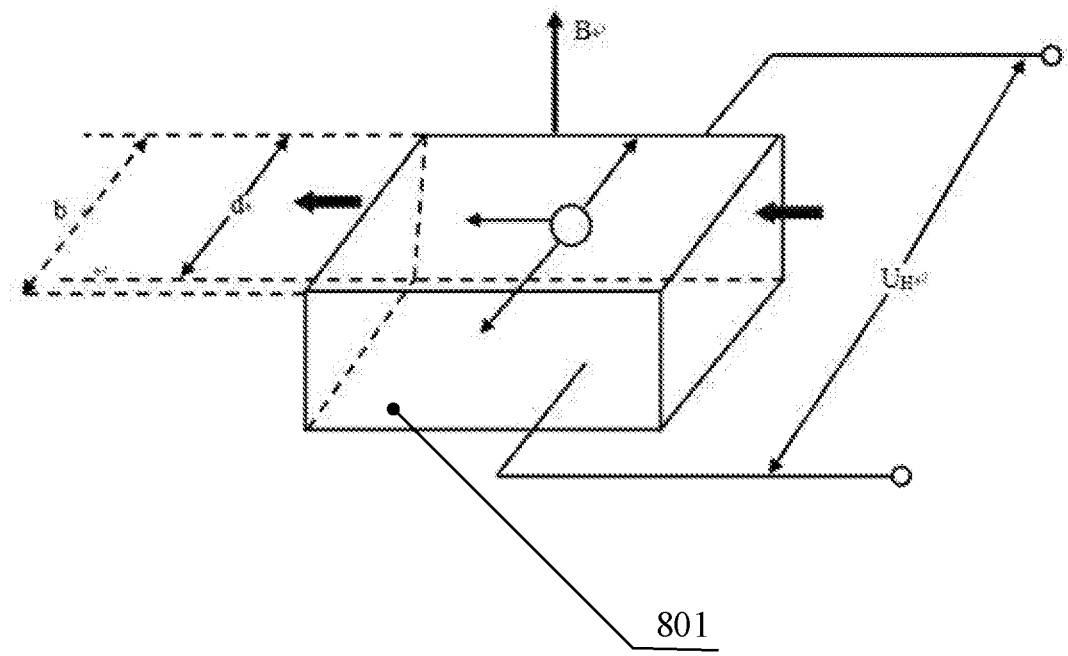
FIG. 8 is a schematic diagram showing detecting of a magnetic field by a Hall effect principle.

In some embodiments, the user terminal measures the magnetic field by the Hall effect principle. FIG. 8 is a schematic diagram showing detection of a magnetic field by a Hall effect principle in the related art. In some embodiments, the magnetic-field measuring component 801 is built in the user terminal. In some embodiments, the magnetic-field measuring component 801 is a cuboid semiconductor material connected to a circuit. In some embodiments, a side surface and a bottom surface of the magnetic-field measuring component 801 are parallel to a circuit passing therethrough.

The magnetic-field measuring component 801 has a width b, a thickness d, and a length l. In some embodiments, when the magnetic-field measuring component 801 is electrified, a current flows along a side with the length l of the magnetic-field measuring component 801. In some embodiments, when a magnetic field with a magnetic induction intensity of B passes through the magnetic-field measuring component in a vertically upward direction, namely, a plane made up of a length and a width, a motion charge in the magnetic-field measuring component 801 will be simultaneously affected by a Lorentz force and an electric field force.

Due to different charge properties of positive and negative charges, in the magnetic-field measuring component 801, the positive and negative charges will be separated to two sides in a direction b. Since the positive and negative charges are separated to the two sides, a Hall voltage Uh will be generated in the direction b. Balanced by the electric field force and the Lorentz force, a formula 1 may be obtained using a single charge as an analysis object:

$$qv_d B = qE_h, \quad (1)$$

in which q is the quantity of charge carried by a single motion charge, $v_d$ is a movement velocity of the charge, $E_h$ is an electric field intensity of a Hall voltage caused by the Lorentz force in a width direction, and B represents the magnetic induction intensity of the magnetic field. Refer to formula 2 for a representation formula of $E_h$:

$$E_h = v_d \cdot B \quad (2)$$

By determination of the electric field intensity, the value of the Hall voltage $U_h$ can be further determined. Refer to formula 3 for a representation formula of the Hall voltage $U_h$:

$$U_h = E_h \cdot b = v_d \cdot b \cdot B. \quad (3)$$

Meanwhile, refer to formula 4 for a representation formula of a current intensity I produced by the Hall effect:

$$I = q \cdot n \cdot v_d \cdot S = q \cdot n \cdot v_d \cdot b \cdot d, \quad (4)$$

in which n indicates the charge density, q indicates the charge level, and S is a cross sectional area of the magnetic-field measuring component 801 through which the current flows. In this example, the cross-sectional area is the product of the width b and the height d, and $v_d \cdot S$ is a unit volume per unit time.

At last, the Hall voltage is obtained by the above-mentioned parameters and formula 5:

$$v_d \cdot b = I/(q \cdot n \cdot d);$$

$$U_h = IB/(n \cdot q \cdot d). \quad (5)$$

In some embodiments, after the Hall voltage is obtained, the obtained Hall voltage is processed and finally converted into a magnetic-field intensity signal to measure the magnetic field environment.

In these embodiments, the magnetic-field measuring component for measuring the magnetic field using the Hall effect principle is disposed in each of the first geomagnetic module and the second geomagnetic module. In some embodiments, after the Hall voltage is obtained, the CPU further processes the Hall voltage, including enabling the Hall voltage to pass through a chopper switch, removing a bias voltage, and then inputting the processed Hall voltage into an operational amplifier circuit for amplification to obtain an amplified signal. In some embodiments, the CPU includes a register. After the amplified signal is collected, the collected signal will be stored in a corresponding register. The target geomagnetic module will acquire the collected signals, and obtain the magnetic-field intensity signal via operation to further complete detection of the magnetic field environment.

In some embodiments, since the body status of the folding screen device is relatively complicated, after obtaining the magnetic field intensity, a soft magnetic compensation and a hard magnetic compensation will also be performed on the obtained magnetic-field intensity signal. In some embodiments, the soft magnetic compensation is a compensation produced for soft magnetic interference. The soft magnetic interference indicates an interference caused by the phenomenon that a magnetic field detected by the geomagnetic module changes from a circle to an oval since a magnetic object is placed nearby the geomagnetic module. In some embodiments, by such mathematical processing as fitting of an ellipsoid formula and calculation of the least square method, a circle center offset of the magnetic field can be obtained, and by amendment of the center offset, the soft magnetic compensation is performed on the soft magnetic interference.

In some embodiments, the hard magnetic interference indicates an impact on the geomagnetic module from a magnetic dipole inside the folding screen device. In some embodiments, a sphere center offset of the magnetic field is obtained by deriving a rotation matrix, and data processing for eliminating the impact of the offset is performed on the finally obtained magnetic-field intensity signal so as to achieve the effect of hard magnetic compensation.

As such, according to the method provided by these embodiments, by acquiring acceleration data, determining the body status, further determining the target geomagnetic module for detection, and detecting the magnetic field environment of the folding screen device, the folding screen device in different working statuses can accurately detect the magnetic field environment by the corresponding geomagnetic module.

Figure 9:
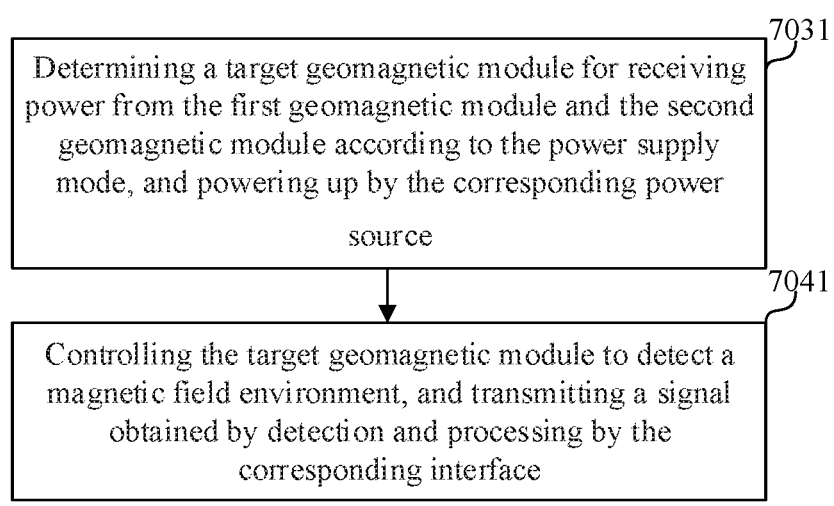
FIG. 9 is a flowchart of a magnetic-field detecting method implemented by a folding screen device provided by another embodiment of the present disclosure.

In some embodiments based on FIG. 7, with reference also to the flowchart of a magnetic-field detecting method illustrated in FIG. 9 for a folding screen device provided by some embodiments of the present disclosure, the method can be applied to the folding screen device shown in FIG. 6.

For example, based on FIG. 5, the folding screen device further includes a first power source, a second power source, a first resistor, a second resistor, a third resistor and a fourth resistor. The CPU includes a first control interface, a first data interface, a second control interface and a second data interface. A first geomagnetic module includes a first port and a second port. A second geomagnetic module includes a third port and a fourth port. In these embodiments, steps 703 and 704 in the foregoing embodiment may be replaced with steps 7031 and 7041.

In step 7031, a target geomagnetic module for receiving power is determined from the first geomagnetic module and the second geomagnetic module according to the power supply mode, and powered up by the corresponding power source.

In some embodiments, the folding screen device further includes the first power source and the second power source. In some embodiments, the first power source supplies power for the first geomagnetic module, and the second power source supplies power for the second geomagnetic module. In some embodiments, in order to facilitate wiring inside the folding screen device, the first power source is disposed inside a first body, and the second power source is disposed inside a second body. In some embodiments, each of the first power source and the second power source is provided with a switch and controlled by the CPU. The CPU controls power supply for the first geomagnetic module and the second geomagnetic module by turning on and off the switches of the first power source and the second power source.

In step 7041, the target geomagnetic module is controlled to detect a magnetic field environment, and a signal obtained by detection is transmitted and processed by the corresponding interface.

In some embodiments, a first port of the first power source is connected to the first geomagnetic module by the first resistor. A second port of the first power source is connected to the first geomagnetic module by the second resistor. A first port of the second power source is connected to the second geomagnetic module by the third resistor. A second port of the second power source is connected to the fourth resistor.

In some embodiments, the CPU includes a first control interface and a first data interface. The first geomagnetic module includes the first port connected to the first control interface and the second port connected to the first data interface.

In some embodiments, the CPU includes a first control interface, a first data interface, a second control interface and a second data interface.

Owing to the above-mentioned circuit layout, the first port of the first power source, the first resistor and the first control interface of the CPU are in the same line as the first port of the first geomagnetic module; the second port of the first power source, the second resistor, and the first data interface of the CPU are in the same line as the second port of the first geomagnetic module; the first port of the second power supply, the third resistor and the second control interface of the CPU are in the same line as the third port of the second geomagnetic module; and the second port of the second power source, the fourth resistor, and the second data interface of the CPU are in the same line as the fourth port of the second geomagnetic module.

In some embodiments, the target geomagnetic module measures the magnetic field by the built-in magnetic-field measuring component based on the Hall effect principle, and finally obtains the magnetic field intensity signal. In some embodiments, due to the uncertainty between the magnetic field intensity and direction, the magnitude of the magnetic field intensity is also uncertain. However, only when the signal is within a high-level threshold or low-level threshold, will the signal be accurately transmitted in the line and be accurately processed by the CPU and the geomagnetic module.

Therefore, in some embodiments, the first data interface, the first control interface, the second data interface, and the second control interface are disposed on the CPU to bidirectionally transmit data information and control information with the first geomagnetic module and to bidirectionally transmit data information and control information with the second geomagnetic module. In some embodiments, taking a circuit constituted by the first port of the first power source, the first resistor, the first control interface of the CPU and the first port of the first geomagnetic module as an example, due to power supply by the first power source and transmission of the data signal between the CPU and the first geomagnetic module, the current in the line is unstable, and further, the signals received by the first geomagnetic module and the CPU are unstable and fail to be always within a high-level threshold and a low-level threshold.

At this time, the first resistor is disposed. In some embodiments, the first resistor plays a role of pulling up or down a voltage drop in the line, and controls the voltage of the data signal in any working status to be within a high-level threshold or a low-level threshold by means of pulling up or down, so as to guarantee a correct signal interaction between the CPU and the first geomagnetic module. In some embodiments, the CPU may be connected to the first geomagnetic module and the second geomagnetic module by a communication protocol of an inter-integrated circuit (I2C) interface.

At this time, the first control interface and the first data interface are a first clock signal line and a first serial bus respectively, and the second control interface and the second data interface are a second clock signal line and a second serial bus respectively. In some embodiments, when the CPU is connected to the first geomagnetic module and the second geomagnetic module by the communication protocol of the I2C, different data transmission addresses need to be set for the first geomagnetic module and the second geomagnetic module.

As such, according to the method provided by these embodiments, by acquiring the acceleration data, determining the body status, further determining the target geomagnetic module for detection, and detecting the magnetic field environment of the folding screen device, the folding screen device in different working statuses can accurately detect the magnetic field environment by the corresponding geomagnetic module. Since the first power source and the second power source are independently disposed, the first geomagnetic module and the second geomagnetic module are independently powered up, and further, start and stop of the geomagnetic modules are independently controlled. Owing to the different lines between the CPU and the geomagnetic modules, as well as the pull-up resistors on the corresponding lines, electrical signals received by the geomagnetic modules are always valid signals.

Figure 10:
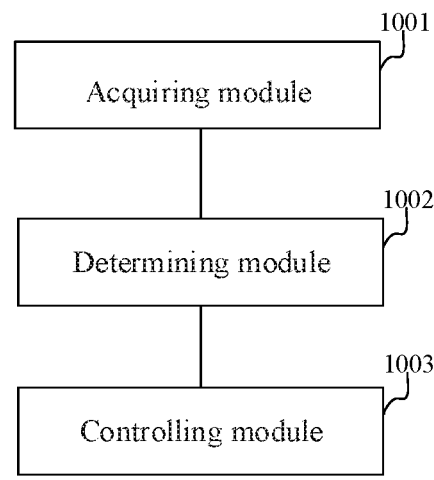
FIG. 10 is a block diagram of a magnetic-field detecting apparatus of a folding screen device provided by some embodiments of the present disclosure.

FIG. 10 is a block diagram of a magnetic-field detecting apparatus for a folding screen device provided by some embodiments of the present disclosure. The magnetic-field detecting apparatus may become all or part of the folding screen device by software, hardware or a combination thereof, and includes:

an acquiring module 1001, configured to acquire first acceleration data collected by a first acceleration gyro sensor and second acceleration data collected by a second acceleration gyro sensor;

a determining module 1002, configured to determine power supply modes for a first geomagnetic module and a second geomagnetic module according to the first acceleration data and the second acceleration data, and to determine, from the first geomagnetic module and the second geomagnetic module, a target geomagnetic module for receiving power according to the power supply mode; and a controlling module 1003, configured to control the target geomagnetic module to detect a magnetic field environment.

In one example, a first body includes a first display screen, a second body includes a second display screen, and the determining the power supply modes for the first geomagnetic module and the second geomagnetic module according to the first body status and the second body status includes:

a controlling module 1003, configured to supply power for the first geomagnetic module and the second geomagnetic module when both of the first display screen and the second display screen face vertically upward;

to supply power for the first geomagnetic module when the first display screen faces vertically upward and the second display screen faces vertically downward; and to supply power for the second geomagnetic module when the second display screen faces vertically upward and the first display screen faces vertically downward.

The controlling module 1003 is further configured to determine a second body status of the second body according to the second acceleration data.

The controlling module 1003 is further configured to determine a power supply mode for the first geomagnetic module and the second geomagnetic module according to the first body status and the second body status.

In one example, the folding screen device further includes a first power source connected to the first geomagnetic module and a second power source connected to the second geomagnetic module.

The controlling module 1003 is further configured to control the first power source to supply power for the first geomagnetic module when the power supply mode indicates that a target geomagnetic module for receiving power includes the first geomagnetic module.

The controlling module 1003 is further configured to control the second power source to supply power for the second geomagnetic module when the power supply mode indicates that the target geomagnetic module for receiving power includes the second geomagnetic module.

In one example, the folding screen device further includes a first resistor, a second resistor, a third resistor and a fourth resistor.

A first end of the first power source is connected to a first port of the first geomagnetic module by the first resistor. A second end of the first power source is connected to a second port of the first geomagnetic module by the second resistor. The first resistor and the second resistor are configured to control an output voltage of the first power source.

A first end of the second power source is connected to a third port of the second geomagnetic module by the third resistor. A second end of the second power source is connected to a fourth port of the second geomagnetic module by the fourth resistor. The third resistor and the fourth resistor are configured to control an output voltage of the second power source.

It should be noted that the magnetic-field detecting apparatus for the folding screen device provided by the foregoing embodiment only takes division of all the functional modules as an example for explanation. In practice, the above functions can be completed by the different functional modules as required. That is, the inwardly structure of the apparatus is divided into different functional modules to complete all or part of the functions described above.

Figure 11:
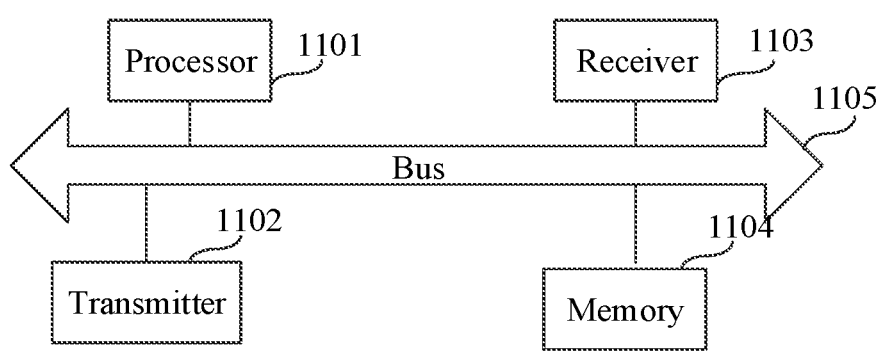
FIG. 11 is a schematic structural diagram of a folding screen device provided by some embodiments of the present disclosure.

FIG. 11 is a schematic structural diagram of a folding screen device provided by some embodiments of the present disclosure. The folding screen device includes the following components.

A processor 1101 includes one or more processing cores and executes various function applications and information processing by running software programs and modules.

A transmitter 1102 and a receiver 1103 may be implemented as one communication component which may be a communication chip.

A memory 1104 is connected to the processor 1101 by a bus 1105.

The memory 1104 is configured to store at least one instruction. The processor 1101 is configured to execute the at least one instruction to implement all steps in the above-mentioned method embodiments.

Some embodiments of the present disclosure further provide a computer-readable storage medium. At least one instruction, at least one program and a code set or an instruction set are stored in the computer-readable storage medium and loaded and executed by the processor to implement the magnetic-field detecting methods for the folding screen devices provided by the above-mentioned method embodiments.

Understandably, the term "plurality" herein refers to two or more. "And/or" herein describes the correspondence of the corresponding objects, indicating three kinds of relationship. For example, A and/or B, can be expressed as: A exists alone, A and B exist concurrently, B exists alone. The character "/" generally indicates that the context object is an "OR" relationship.

Communication systems and service scenarios, described in the embodiments of the present disclosure, are used to more clearly illustrate the technical solutions of the embodiments of the present disclosure, and do not constitute a limitation to the technical solutions provided by the embodiments of the present disclosure. It is known by those of ordinary skill in the art that, with evolution of the communication systems and emergence of new service scenarios, the technical solutions provided by the embodiments of the present disclosure are also applicable to similar technical problems.

In some embodiments, the folding screen device further includes a first power source and a second power source, wherein the first power source is connected to the first geomagnetic module and configured to supply power for the first geomagnetic module with control of the CPU; and the second power source is connected to the second geomagnetic module and configured to supply power for the second geomagnetic module with control of the CPU.

In some embodiments, the folding screen device further includes a first resistor and a second resistor, wherein a first end of the first power source is connected to a first port of the first geomagnetic module by the first resistor;

a second end of the first power source is connected to a second port of the first geomagnetic module by the second resistor; and In some embodiments, the CPU includes a first control interface and a first data interface; and the CPU is connected to the first port of the first geomagnetic module by the first control interface and to the second port of the first geomagnetic module by the first data interface.

In some embodiments, the folding screen device further includes a third resistor and a fourth resistor, wherein a first end of the second power source is connected to a third port of the second geomagnetic module by the third resistor;

a second end of the second power source is connected to a fourth port of the second geomagnetic module by the fourth resistor; and In some embodiments, the CPU includes a second control interface and a second data interface; and the CPU is connected to the third port of the second geomagnetic module by the second control interface and to the fourth port of the second geomagnetic module by the second data interface.

In some embodiments, the folding screen device further includes a first power source and a second power source, wherein the first power source is connected to the first geomagnetic module and configured to supply power for the first geomagnetic module with control of the CPU; and the second power source is connected to the second geomagnetic module and configured to supply power for the second geomagnetic module with control of the CPU.

In some embodiments, the folding screen device further includes a first resistor and a second resistor, wherein a first end of the first power source is connected to a first port of the first geomagnetic module by the first resistor;

a second end of the first power source is connected to a second port of the first geomagnetic module by the second resistor; and In some embodiments, the CPU includes a first control interface and a first data interface; and the CPU is connected to the first port of the first geomagnetic module by the first control interface and to the second port of the first geomagnetic module by the first data interface.

In some embodiments, the folding screen device further includes a third resistor and a fourth resistor, wherein a first end of the second power source is connected to a third port of the second geomagnetic module by the third resistor;

a second end of the second power source is connected to a fourth port of the second geomagnetic module by the fourth resistor; and In some embodiments, the CPU includes a second control interface and a second data interface; and the CPU is connected to the third port of the second geomagnetic module by the second control interface and to the fourth port of the second geomagnetic module by the second data interface.

In some embodiments, the folding screen device further includes a first power source and a second power source, wherein the first power source is connected to the first geomagnetic module and configured to supply power for the first geomagnetic module with control of the CPU; and the second power source is connected to the second geomagnetic module and configured to supply power for the second geomagnetic module with control of the CPU.

In some embodiments, the folding screen device further includes a first resistor and a second resistor, wherein a first end of the first power source is connected to a first port of the first geomagnetic module by the first resistor;

a second end of the first power source is connected to a second port of the first geomagnetic module by the second resistor; and In some embodiments, the CPU includes a first control interface and a first data interface; and the CPU is connected to the first port of the first geomagnetic module by the first control interface and to the second port of the first geomagnetic module by the first data interface.

In some embodiments, the folding screen device further includes a third resistor and a fourth resistor, wherein a first end of the second power source is connected to a third port of the second geomagnetic module by the third resistor;

a second end of the second power source is connected to a fourth port of the second geomagnetic module by the fourth resistor; and In some embodiments, the CPU includes a second control interface and a second data interface; and the CPU is connected to the third port of the second geomagnetic module by the second control interface and to the fourth port of the second geomagnetic module by the second data interface.

In some embodiments, the determining the power supply modes for the first geomagnetic module and the second geomagnetic module according to the first acceleration data and the second acceleration data includes:

determining a first body status of the first body according to the first acceleration data; determining a second body status of the second body according to the second acceleration data; and determining power supply modes for the first geomagnetic module and the second geomagnetic module according to the first body status and the second body status.

In some embodiments, the first body includes a first display screen, the second body includes a second display screen, and the determining the power supply modes for the first geomagnetic module and the second geomagnetic module according to the first body status and the second body status includes:

supplying power for the first geomagnetic module and the second geomagnetic module when both of the first display screen and the second display screen are vertically upward;

supplying power for the first geomagnetic module when the first display screen is vertically upward and the second display screen is vertically downward; and supplying power for the second geomagnetic module when the second display screen is vertically upward and the first display screen is vertically downward.

In some embodiments, the folding screen device further includes a first power source connected to the first geomagnetic module and a second power source connected to the second geomagnetic module; and the method further includes:

controlling the first power source to supply power for the first geomagnetic module when the power supply mode is configured to indicate that the target geomagnetic module for receiving power includes the first geomagnetic module; and controlling the second power source to supply power for the second geomagnetic module when the power supply mode is configured to indicate that the target geomagnetic module for receiving power includes the second geomagnetic module.

In some embodiments, the folding screen device further includes a first resistor, a second resistor, a third resistor and a fourth resistor; a first end of the first power source is connected to a first port of the first geomagnetic module by the first resistor, a second end of the first power source is connected to a second port of the first geomagnetic module by the second resistor, and the first resistor and the second resistor are configured to control an output voltage of the first power source; and a first end of the second power source is connected to a third port of the second geomagnetic module by the third resistor, a second end of the second power source is connected to a fourth port of the second geomagnetic module by the fourth resistor, and the third resistor and the fourth resistor are configured to control an output voltage of the second power source.

In another aspect, there is providing a magnetic-field detecting apparatus for a folding screen device, including:

an acquiring module, configured to acquire first acceleration data collected by the first acceleration gyro sensor and second acceleration data collected by the second acceleration gyro sensor;

a determining module, configured to determine power supply modes for the first geomagnetic module and the second geomagnetic module according to the first acceleration data and the second acceleration data, a determining module, to determine, from the first geomagnetic module and the second geomagnetic module, a target geomagnetic module for receiving power according to the power supply mode; and a controlling module, configured to control the target geomagnetic module to detect a magnetic field environment.

In some embodiments, the determining module is configured to determine a first body status of a first body according to the first acceleration data.

The determining module is further configured to determine a second body status of a second body according to the second acceleration data.

The determining module is further configured to determine power supply modes for the first geomagnetic module and the second geomagnetic module according to the first body status and the second body status.

In some embodiments, the folding screen device further includes a first power source connected to the first geomagnetic module and a second power source connected to the second geomagnetic module.

A controlling module is configured to control the first power source to supply power for the first geomagnetic module when the power supply mode indicates that a target geomagnetic module for receiving power includes the first geomagnetic module.

The controlling module is further configured to control the second power source to supply power for the second geomagnetic module when the power supply mode indicates that the target geomagnetic module for receiving power includes the second geomagnetic module.

In some embodiments, the first body includes a first display screen, the second body includes a second display screen, and the controlling module is configured to supply power for the first geomagnetic module and the second geomagnetic module when both of the first display screen and the second display screen face vertically upward.

The controlling module is further configured to supply power for the first geomagnetic module when the first display screen faces vertically upward and the second display screen faces vertically downward.

The controlling module is further configured to supply power for the second geomagnetic module when the second display screen faces vertically upward and the first display screen faces vertically downward.

In some embodiments, the folding screen device further includes a first resistor, a second resistor, a third resistor and a fourth resistor.

A first end of the first power source is connected to a first port of the first geomagnetic module by the first resistor. A second end of the first power source is connected to a second port of the first geomagnetic module by the second resistor. The first resistor and the second resistor are configured to control an output voltage of the first power source.

A first end of the second power source is connected to a third port of the second geomagnetic module by the third resistor. A second end of the second power source is connected to a fourth port of the second geomagnetic module by the fourth resistor. The third resistor and the fourth resistor are configured to control an output voltage of the second power source.

Various embodiments of the present disclosure can have one or more of the following advantages.

The first acceleration gyro sensor and the second acceleration gyro sensor are disposed to detect the body status of the folding screen device to further determine the working statuses of the first geomagnetic module and the second geomagnetic module, and the magnetic-field environment of the folding screen device is detected by the first geomagnetic module and/or the second geomagnetic module, such that the folding screen device in different working statuses can accurately detect the magnetic field environment by the corresponding geomagnetic module.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only some embodiments.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least some embodiments or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

Other embodiments of the present disclosure will be apparent to those skilled in the art from consideration of the specification and practice of the technical solution disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

What is claimed is:

1. A folding screen device, comprising a first body, a second body, a central processing unit (CPU), a first acceleration gyro sensor, a second acceleration gyro sensor, a first geomagnetic module, and a second geomagnetic module, wherein
    the first geomagnetic module, the second geomagnetic module, the first acceleration gyro sensor and the second acceleration gyro sensor are coupled to the CPU respectively;
    the first geomagnetic module and the first acceleration gyro sensor are inside the first body, and the second geomagnetic module and the second acceleration gyro sensor are inside the second body;
    the first acceleration gyro sensor and the second acceleration gyro sensor are configured to obtain a body status of the folding screen device; and
    the CPU is configured to control working statuses of the first geomagnetic module and the second geomagnetic module according to the body status.

2. The folding screen device according to claim 1, further comprising a first power source and a second power source, wherein
    the first power source is connected to the first geomagnetic module and configured to supply power for the first geomagnetic module with control of the CPU; and
    the second power source is connected to the second geomagnetic module and configured to supply power for the second geomagnetic module with control of the CPU.

3. The folding screen device according to claim 2, further comprising a first resistor and a second resistor, wherein
    a first end of the first power source is connected to a first port of the first geomagnetic module by the first resistor;
    a second end of the first power source is connected to a second port of the first geomagnetic module by the second resistor; and
    the first resistor and the second resistor are configured to control an output voltage of the first power source.

4. The folding screen device according to claim 3, wherein the CPU comprises a first control interface and a first data interface; and
    the CPU is connected to the first port of the first geomagnetic module by the first control interface and to the second port of the first geomagnetic module by the first data interface.

5. The folding screen device according to claim 2, further comprising a third resistor and a fourth resistor, wherein
    a first end of the second power source is connected to a third port of the second geomagnetic module by the third resistor;
    a second end of the second power source is connected to a fourth port of the second geomagnetic module by the fourth resistor; and
    the third resistor and the fourth resistor are configured to control an output voltage of the second power source.

6. The folding screen device according to claim 5, wherein the CPU comprises a second control interface and a second data interface; and
    the CPU is connected to the third port of the second geomagnetic module by the second control interface and to the fourth port of the second geomagnetic module by the second data interface.

7. A magnetic-field detecting method implemented by a folding screen device, wherein the folding screen device comprises a first body, a second body, a first acceleration gyro sensor, a second acceleration gyro sensor, a first geomagnetic module and a second geomagnetic module, and the method comprises:
    acquiring first acceleration data collected by the first acceleration gyro sensor and second acceleration data collected by the second acceleration gyro sensor;
    determining power supply modes for the first geomagnetic module and the second geomagnetic module according to the first acceleration data and the second acceleration data;

determining, from the first geomagnetic module and the second geomagnetic module, a target geomagnetic module for receiving power according to the power supply mode;
controlling the target geomagnetic module to detect a magnetic field environment.

8. The method according to claim 7, wherein the determining the power supply modes for the first geomagnetic module and the second geomagnetic module according to the first acceleration data and the second acceleration data comprises:
determining a first body status of the first body according to the first acceleration data;
determining a second body status of the second body according to the second acceleration data; and
determining power supply modes for the first geomagnetic module and the second geomagnetic module according to the first body status and the second body status.

9. The method according to claim 8, wherein the first body comprises a first display screen, the second body comprises a second display screen, and the determining the power supply modes for the first geomagnetic module and the second geomagnetic module according to the first body status and the second body status comprises:
supplying power for the first geomagnetic module and the second geomagnetic module when both of the first display screen and the second display screen are vertically upward;
supplying power for the first geomagnetic module when the first display screen is vertically upward and the second display screen is vertically downward; and
supplying power for the second geomagnetic module when the second display screen is vertically upward and the first display screen is vertically downward.

10. The method according to claim 7, wherein the folding screen device further comprises a first power source connected to the first geomagnetic module and a second power source connected to the second geomagnetic module; and
the method further comprises:
controlling the first power source to supply power for the first geomagnetic module when the power supply mode is configured to indicate that the target geomagnetic module for receiving power comprises the first geomagnetic module; and
controlling the second power source to supply power for the second geomagnetic module when the power supply mode is configured to indicate that the target geomagnetic module for receiving power comprises the second geomagnetic module.

11. The method according to claim 10, wherein the folding screen device further comprises a first resistor, a second resistor, a third resistor and a fourth resistor;
a first end of the first power source is connected to a first port of the first geomagnetic module by the first resistor, a second end of the first power source is connected to a second port of the first geomagnetic module by the second resistor, and the first resistor and the second resistor are configured to control an output voltage of the first power source; and
a first end of the second power source is connected to a third port of the second geomagnetic module by the third resistor, a second end of the second power source is connected to a fourth port of the second geomagnetic module by the fourth resistor, and the third resistor and the fourth resistor are configured to control an output voltage of the second power source.

12. The method according to claim 8, wherein the folding screen device further comprises a first power source connected to the first geomagnetic module and a second power source connected to the second geomagnetic module; and
the method further comprises:
controlling the first power source to supply power for the first geomagnetic module when the power supply mode is configured to indicate that the target geomagnetic module for receiving power comprises the first geomagnetic module; and
controlling the second power source to supply power for the second geomagnetic module when the power supply mode is configured to indicate that the target geomagnetic module for receiving power comprises the second geomagnetic module.

13. The method according to claim 9, wherein the folding screen device further comprises a first power source connected to the first geomagnetic module and a second power source connected to the second geomagnetic module; and
the method further comprises:
controlling the first power source to supply power for the first geomagnetic module when the power supply mode is configured to indicate that the target geomagnetic module for receiving power comprises the first geomagnetic module; and
controlling the second power source to supply power for the second geomagnetic module when the power supply mode is configured to indicate that the target geomagnetic module for receiving power comprises the second geomagnetic module.

14. A folding screen device, comprising a processor, and memory storing at least one instruction, at least one program and a code set or an instruction set for execution by the processor to:
acquire first acceleration data collected by the first acceleration gyro sensor and second acceleration data collected by the second acceleration gyro sensor;
determine power supply modes for the first geomagnetic module and the second geomagnetic module according to the first acceleration data and the second acceleration data;
determine, from the first geomagnetic module and the second geomagnetic module, a target geomagnetic module for receiving power according to the power supply mode; and
control the target geomagnetic module to detect a magnetic field environment.

15. The folding screen device according to claim 14, wherein the processor is further configured to:
determine a first body status of the first body according to the first acceleration data;
determine a second body status of the second body according to the second acceleration data; and
determine power supply modes for the first geomagnetic module and the second geomagnetic module according to the first body status and the second body status.

16. The folding screen device according to claim 15, wherein the processor is further configured to:
supply power for the first geomagnetic module and the second geomagnetic module when both of the first display screen and the second display screen are vertically upward;
supply power for the first geomagnetic module when the first display screen is vertically upward and the second display screen is vertically downward; and supply power for the second geomagnetic module when the second display screen is vertically upward and the first display screen is vertically downward.

17. The folding screen device according to claim 14, wherein the processor is further configured to:
   control the first power source to supply power for the first geomagnetic module when the power supply mode is configured to indicate that the target geomagnetic module for receiving power comprises the first geomagnetic module; and
   control the second power source to supply power for the second geomagnetic module when the power supply mode is configured to indicate that the target geomagnetic module for receiving power comprises the second geomagnetic module.

18. A non-transitory computer-readable storage medium storing at least one instruction, at least one program and a code set or an instruction set for execution by a processor to implement the magnetic-field detecting method for the folding screen device according to claim 7.

19. A mobile terminal comprising the folding screen device according to claim 1, wherein the first acceleration gyro sensor and the second acceleration gyro sensor are configured to detect the body status of the folding screen device to further determine the working statuses of the first geomagnetic module and the second geomagnetic module, and the magnetic-field environment of the folding screen device is detected by the first geomagnetic module and/or the second geomagnetic module, thereby facilitating the folding screen device in different working statuses to accurately detect the magnetic field environment by the corresponding geomagnetic module.

20. The folding screen device according to claim 1, wherein the first body comprises a first display screen, the second body comprises a second display screen, and the body status refers to an orientation of the first display screen and the second display screen.

* * * * *